Patented Nov. 25, 1941

2,263,562

UNITED STATES PATENT OFFICE 2,263,562

SULPHUR DYES DERIVED FROM AROMATIC BIGUANIDES

Newell M. Bigelow and John Elton Cole, Wilmington, Del., assignors to E. I. du Pont de Nemours & Company, Wilmington, Del., a corporation of Delaware No Drawing. Application October 5, 1940, Serial No. 359,902

6 Claims. (Cl. 260—132)

This invention relates to new sulphur dyes which dye cotton in novel shades having excellent fastness properties, and to processes of making the dyes.

It is among the objects of the present invention to provide new sulphur dyes. Another object of the invention is to provide sulphur dyes which are capable of dyeing cotton in novel shades. Another object of the invention is to provide sulphur dyes which give novel dyeings on cotton having excellent brightness and fastness properties. A further object of the invention is to provide processes for manufacturing the new dyes. Other objects of the invention will be apparent from the following description.

The objects of the invention are attained in general by thionating by the action of sulphur and in the presence of an adjuvant an amine of the benzene series in which one amino group or two amino groups are blocked by a guanidyl group. The dye may then be separated from the thionation medium by methods known to the art. Upon thionating certain of such blocked amines of the benzene series, the discovery has been made that sulphur dyes are produced which have novel shades of yellow to reddish orange and that the dyeings on cotton made with these dyes have excellent brightness and fastness properties.

The invention will be more fully set forth in the following more detailed description which includes examples that are given as illustrative embodiments of the invention and not as limitations thereof. Parts are expressed in parts by weight unless otherwise noted.

Example I

One part of phenyl biguanide (free base) was mixed in a stainless steel container with 1.0 part of meta-toluylene-diamine and 10 parts of sulphur. The mixture was heated to 250° C. until a small sample of the thionation mass, removed from the container and dyed on cotton from a sulphide bath, showed that the desired strength and shade of the product had been reached. This required about 8 to 12 hours.

The thionation mass was allowed to cool. The cooled solid was ground and mixed with 20 parts of water and five parts of sodium hydroxide. This mixture was then agitated for about two hours at a temperature near its boiling point and then filtered. Upon cooling the filtrate to 10° C. and acidifying with 37% hydrochloric acid, a light colored amorphous dye was formed in the solution. The dye was filtered off, washed with water and dried in a vacuum oven at 60° C.

The product was insoluble in water but was soluble in warm dilute aqueous sodium sulphide solution. A piece of cotton goods was dyed in an aqueous sodium sulphide solution and then developed by exposing to the air. An orange shade was developed. The fastness properties of the dyeing to light and laundering were superior as compared to dyeings made with other sulphur dyes of approximately similar shade.

Example II

One part of phenyl biguanide hydrochloride was mixed with three parts of water. Sodium bicarbonate (0.35 part) was added, and the mixture agitated well at room temperature. The resulting slurry was transferred to a stainless steel thionating kettle; to it was added 0.46 part of m-toluylene diamine, 0.35 part of benzidine and 2.94 parts of sulphur. This mixture was heated over the course of three hours to a final temperature of 240° C. and held at this temperature for 8 hours. Then the thionation mass was allowed to cool. When solid, it was ground coarsely and suspended in 20 parts of water. Sodium hydroxide (five parts) was added, and the mixture was agitated at or near its boiling point for two hours. Then the suspension was filtered; the filtrate was cooled to 10° C. and acidified with 37% hydrochloric acid. The dye separated out in the form of a light-colored amorphous solid. This was filtered off, washed with water and dried in a vacuum oven at 60°. The product was insoluble in water, but soluble in warm dilute sodium sulphide solution. Cotton goods immersed in this solution, then exposed to air, were dyed a reddish yellow shade. The fastness properties of the dyeing to light and to laundering were superior to other yellows of approximately similar shade.

Phenyl biguanide hydrochloride was prepared by dissolving one part of aniline in six parts of water and 1.22 parts of 37% hydrochloric acid. The mixture was heated to its boiling point with agitation. Then 1.08 parts of dicyan-diamine were added. The mixture was agitated at or near its boiling point for a half hour, and then cooled; phenyl biguanide hydrochloride separated out in crystalline form. The product was filtered off and washed sparingly with cold water and dried in a vacuum oven at 60° C.

Example III

One part of the hydrochloride of 4-aminophenyl-biguanide, 2.4 parts of m-toluylene diamine and 10.0 parts of sulphur were mixed in a stainless steel thionating kettle. The mixture was heated to a temperature of 240° C. and held at this temperature for 10 hours. Agitation was continued until the mixture became too thick to stir, and then was discontinued. When the thionation was complete, the mass was cooled, removed from the kettle and ground coarsely. It was suspended in 100 parts of water and 28 parts of sodium sulphite were added. The resulting suspension was digested at 95° for 4 hours, during which time the excess sulphur dissolved and the dye remained in suspension. Then the mixture was filtered; the light-colored amorphous solid was washed with water and dried at 75°. The product was insoluble in water and all the common organic solvents; it dissolved readily in warm dilute sodium sulphide forming a tan solution. Vegetable fibres, immersed in this solution and then exposed to the air, were dyed an orange shade, similar or slightly superior in its shade and fastness properties to those of the orange sulphur dyes now commercially available.

The 4-amino-phenyl-biguanide hydrochloride was made by suspending one part of p-nitro-aniline in a mixture of 0.85 part of 37% hydrochloric acid and 16 parts of water. The mixture was heated to 100° C. Dicyan-diamide (0.72 part) was added, and the mixture heated at or near its boiling point for a half hour, during which time a heavy crystalline solid separated out. The mixture was cooled; the product was filtered off, washed with water and dried. It was then suspended in methyl alcohol and carefully neutralized by the addition of potassium carbonate. The neutral solution was reduced by hydrogen in the presence of finely divided metallic nickel. When reduction was complete the mixture was filtered, acidified to Congo Red paper with 37% hydrochloric acid and evaporated to a small volume. A crystalline precipitate of the hydrochloride of the condensation product separated out; this was dried at room temperature. Analysis indicated that a considerable amount of nitrogen was lost during the reduction of the dye.

*Example IV*

One part of the hydrochloride of 1,4-phenylene-di-biguanide was suspended in 2.0 parts of water and neutralized carefully with solid sodium bicarbonate. The neutralized mixture was transferred to a stainless steel thionating kettle; 4.0 parts of m-toluylene diamine and 4.0 parts of sulphur were added. The kettle and its contents were heated to 210-220° C. and held at this temperature for 10 hours. At the end of this period the thionation mass was cooled, removed from the kettle and ground coarsely. The ground crude product was suspended in 20 parts of water; 7.0 parts of sodium hydroxide were added, and the suspension was digested at 90-95° C. until all of the excess sulphur had gone into solution. Then the mixture was filtered; the filtrate was chilled to 0° C. and acidified with 37% hydrochloric acid at this temperature. The cream-colored amorphous product was filtered off, washed with water and dried at 70° C. The product was insoluble in water and the common organic solvents; it was readily soluble in warm dilute sodium sulphite solution. Vegetable fibres, immersed in this solution, then exposed to the air, were dyed an attractive orange shade, with good fastness properties.

By using an adjuvant consisting of 0.75 part of meta-toluylene-diamine and 2.01 parts of benzidine, a dye which gave yellow shades on cotton was made.

1,4-phenylene-di-biguanide hydrochloride was made by dissolving one part of p-phenylene diamine in a mixture of 11 parts of water and 0.98 part of 37% hydrochloric acid. The solution was heated to 95° C.; to it was added, with agitation, 2.1 parts of dicyan-diamide. The solution was agitated at 95° C. for a half hour; then it was chilled to 0°. The product separated out in crystalline condition; it was filtered, washed very sparingly with cold water (in which it was quite soluble) and dried in a vacuum oven at 65° C.

*Example V*

A mixture of 8.0 parts of sulphur, one part of the hydrochloride of 2,4-toluylene-di-biguanide and 1.0 part of meta-toluylene-diamine was made by heating the sulphur to 140° C. in a stainless steel kettle and adding the other constituents. The mixture was then heated to 220° C. and held at this temperature for 18 hours. Agitation was continued until the mass became too thick to stir and the thionation was completed without agitation. The cooled and ground mass was mixed into 20 parts of water containing 5 parts of sodium carbonate. The mixture was heated to 70° C. and whilst maintaining the mixture slightly alkaline to Clayton Yellow paper by adding caustic soda, a stream of air in finely divided bubbles was passed through it until the excess of sulphur was converted to sodium thiosulphate. The dye which was precipitated in the mixture was filtered off as an amorphous solid, washed and dried.

The product was insoluble in water but soluble in warm dilute aqueous sodium sulphide solution. Developed dyeings on cotton which were dyed from an aqueous sodium sulphide solution were an orange shade. Dyeings of this product on cotton were superior to those of commercially available orange sulphur dyes in fastness to light and laundering.

A dye which gave a yellower shade on cotton was made by using as the adjuvant in the foregoing procedure 1.0 part of meta-toluylene-diamine and 3.0 parts of benzidine instead of the adjuvant recited in the foregoing example.

*Example VI*

Seven parts of sulphur were heated to 140° C. in a stainless steel agitator. To it was added 1.0 part of the hydrochloride of 2,4-toluylene-di-biguanide and 0.8 part of benzidine. The temperature of the thionation mass was raised to 240° and held at this temperature for 8 hours. Agitation was continued as long as possible; when the mass became too thick to stir, the heating was continued without agitation. After twelve hours of heating, the mass was cooled and ground coarsely. This product was suspended in 20 parts of water; 5 parts of sodium hydroxide was added and the mixture was warmed to 70° C. A stream of air in finely divided bubbles was forced through the suspension; it was maintained slightly alkaline to Clayton Yellow test papers during the aeration by frequent additions of small amounts of sodium hydroxide. When all of the excess sulphur had been convered to sodium thiosulphate and the dye had been precipitated in its insoluble oxidized form, the suspension was filtered. The amorphous product was filtered off, washed well with water and dried.

The product is insoluble in water and in most organic solvents. It is soluble in warm dilute sodium sulphide. Cotton fibres, immersed in this bath and then exposed to the air, are dyed an attractive yellow shade. This dye is inferior to commercially available dyes of roughly similar shade fastness to bleaching agents; it is similar in fastness to laundering, and superior in fastness to light.

Meta-toluylene-di-biguanide hydrochloride was prepared by dissolving one part of m-toluylenediamine in 18.0 parts of a 4% solution of hydrochloric acid in water. The solution was heated to 95° C.; to it, was added, with agitation, 1.65 parts of dicyan-diamide. The solution was agitated at the above temperature for an hour; then it was chilled at 0° C. The white crystalline product which separated out was filtered off and washed with a small amount of cold water, in which it is rather soluble.

In general the intermediates which are thionated are aryl biguanides or the hydrochlorides thereof, said aryl biguanides being represented by the formula

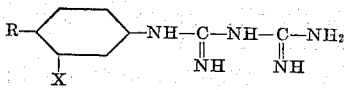

in which R is one of a group consisting of hydrogen, amino and the group

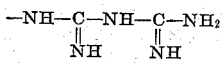

and X is one of a group consisting of hydrogen and methyl.

These aryl biguanides may be prepared in general by condensing in acid medium the hydrochloride of an aromatic amine or diamine of the benzene series with one molecule of dicyan-diamine, or with two such molecules if the primary amine is a diamine and both amino groups are to be blocked. The reaction is represented by the equation

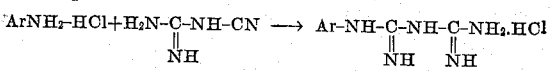

In general the reaction takes place readily and the product separates readily from the reaction mixture but salting out and cooling is sometimes desirable. When the more complicated aromatic amines are used the condensation is not as rapid as it is with the simpler amines and product produced may contain more than one hydrochloride of the condensation product. However, such products can be used without isolating the several hydrochlorides. If it is desired to use the free base as the starting material, it can be obtained by neutralizing the hydrochloride by methods known to the art.

Suitable thionation temperatures are about 175° to about 275° C. but the optimum temperature within this range for any given intermediate cannot be stated more definitely. In general, thionation temperatures below 175° C. produce some color, but the color is weak and the thionation is slow and uneconomical. If the thionation temperature is too high, decomposition takes place and a dye giving dull dyeings is formed. For any particular intermediate, the optimum temperature can be determined by trial. The optimum thionation period is also desirably determined by experiment as the best period for thionation depends to a large extent on the distribution of heat throughout the batch and consequently on the amount of reactants in a batch. Small batches can be thionated more rapidly than large batches. It is desirable to take samples from the thionation mass and make test dyeings. When the thionation has proceeded to a point where bright and strong shades are produced, the thionation is considered completed. In general, a thionation period of about 8 to about 24 hours is required.

Agitation during thionation is desirable, at least as long as the mass can be readily agitated. However, the mass usually becomes so rigid before thionation is completed that agitation during the entire thionation period is not attempted.

The optimum ratio between sulphur and intermediate is dependent on the chemical nature of the intermediate. The chemical processes which take place during thionation are not known, and for this reason no theoretical conclusions can be made. It has been determined empirically, however, that the great majority of intermediates require between 3 and 10 parts of sulphur for satisfactory thionation.

Similarly, it is not understood how and in what molecular relationship adjuvants take part in the chemistry of thionation. For this reason it is impossible to predict the optimum ratio between adjuvant and intermediate and this must be determined by actual experiment. Meta-toluylene-diamine usually performs satisfactorily when present in a ratio between about 0.5 part and about 3.0 parts per part of intermediate. In the case of benzidine the limits of practical operation are even wider; in some cases as little as 0.1 part of benzidine accomplishes the desired result, while in other cases as much as 4 or 5 parts of benzidine per part of intermediate are desirable.

The thionations can be conveniently and desirably started by first melting the sulphur and then adding the other constituents to make the thionation mixture. Any other manner of making the mixture can be used. A convenient general method of preparing the intermediates from arylamines has been indicated but the given method is not essential.

From the foregoing disclosure it will be recognized that the invention is susceptible of modification without departing from the spirit and scope thereof and it is to be understood that the invention is not restricted to the specific illustrations thereof herein set forth.

We claim:
1. A sulphur dye producible by heating at a thionation temperature a mixture containing sulphur, an adjuvant of a group consisting of meta-toluylene-diamine and benzidine, and a compound of a group consisting of the hydrochlorides of the compounds and the compounds represented by the formula

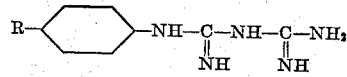

in which R is one of a group consisting of hydrogen, amino and the group

said dye being a water-insoluble thionated compound which is soluble in warm dilute aqueous sodium sulphide solution and which dyes cotton in shades that develop in air to shades of yellow to reddish orange.

2. A sulphur dye producible by heating at a thionation temperature a mixture containing sulphur, phenyl biguanide and an adjuvant of a group consisting of meta-toluylene-diamine and benzidine, said dye being a water-insoluble thionated compound which is soluble in dilute aqueous sodium sulphide solution and which dyes cotton from an aqueous sodium sulphide solution thereof in shades which develop in air to a reddish yellow.

3. A sulphur dye producible by heating at a thionation temperature a mixture containing sulphur, 2,4-toluylene-di-biguanide and an adjuvant consisting of benzidine, said dye being a water-insoluble thionated compound which is soluble in dilute aqueous sodium sulphide solution and which dyes cotton from an aqueous sodium sulphide solution thereof in shades which develop in air to a yellow.

4. A sulphur dye producible by heating at a thionation temperature a mixture containing sulphur, 4-amino-phenyl-biguanide hydrochloride and an adjuvant consisting of meta-toluylene-diamine, said dye being a water-insoluble thionated compound which is soluble in dilute aqueous sodium sulphide solution and which dyes cotton from an aqueous sodium sulphide solution thereof in shades which develop in air to an orange.

5. The process which comprises heating at a thionation temperature a mixture containing sulphur, meta-toluene-diamine and a compound of a group consisting of meta-toluylene di-biguanide, its hydrochloride and the hydrochlorides of the compounds and the compounds represented by the formula

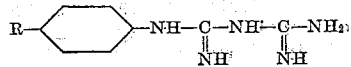

in which R is one of a group consisting of hydrogen, amino and the group

—NH—CNH—NH—CNH—NH$_2$;

said mixture being heated until a water-insoluble thionated compound is formed which is soluble in warm dilute aqueous sodium sulphide solution and which dyes cotton in shades that develop in air to shades of yellow to reddish orange.

6. The process which comprises heating at a thionation temperature a mixture containing sulphur, an adjuvant of a group consisting of meta-toluylene-diamine and benzidine, and a compound of a group consisting of meta-toluylene-di-biguanide, its hydrochloride and the hydrochlorides of the compounds and the compounds represented by the formula

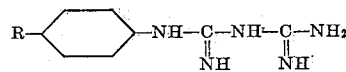

in which R is one of a group consisting of hydrogen, amino and the group

—NH—CNH—NH—CNH—NH$_2$;

said mixture being heated until a water-insoluble thionated compound is formed which is soluble in warm dilute aqueous sodium sulphide solution and which dyes cotton in shades that develop in air to shades of yellow to reddish orange.

NEWELL M. BIGELOW.
JOHN ELTON COLE.